UNITED STATES PATENT OFFICE.

LOUIS ANTOINE GARCHEY, OF PARIS, FRANCE.

METHOD OF MANUFACTURING ARTIFICIAL STONE.

SPECIFICATION forming part of Letters Patent No. 687,011, dated November 19, 1901.

Application filed April 24, 1900. Serial No. 14,149. (No specimens.)

*To all whom it may concern:*

Be it known that I, LOUIS ANTOINE GARCHEY, a citizen of France, residing at 72 Boulevard Haussmann, Paris, France, have invented certain new and useful Improvements in Methods of Manufacturing Artificial Stone, of which the following is a specification.

This invention has reference to improvements in the manufacture of the artificial stone described in the specification of my previous patent, No. 587,809. According to such mode of manufacture I placed the pulverized glass in molds which I introduced into the devitrifying-furnace. This process, however, had two defects:

First. The glass could not be obtained in a pulverized state of uniform grade. The crushers necessarily give grains of different sizes. By placing this glass in molds and by heating the whole to a high temperature I obtained an artificial stone, the appearance of which was, however, not uniform. It was thus impossible to obtain a sufficiently large number of tiles or bricks all having the same appearance.

Second. The metallic molds did not resist the action of the fire, while the refractory molds were subject to too numerous changes of temperature, since it was necessary to withdraw them from the fire during the whole of the time the material was being got ready. Hence they had only a very short life, which rendered the manufacture expensive. Moreover, as the molding was effected when the molds were incandescent the working was dangerous and costly.

Now the object of the present invention is to remedy these defects and to thereby render the manufacture of my products easier and more economical.

According to my improved process of manufacture the workman has near to him a certain number of boxes or troughs—three, for example—filled with pulverized glass of different grades obtained by passing the broken glass coming from the crushers through a suitable sorter. The operator spreads a layer of the largest graded glass on the bottom of the mold. Over this he distributes a layer of intermediate grade, and then finishes with a top layer of the finest glass, so as to form the facing of the tile or brick. In this manner the first of the above-mentioned defects is overcome without waste of glass and without increasing the cost of production.

The mold that I employ is a mold of refractory sand, which does not have any one of the inconveniences of molds of metal or of refractory earth, since the same sand can be utilized over again indefinitely. I dispose the sand on a movable support or tray of refractory earth, which remains permanently in the devitrifying-furnace, which is only withdrawn therefrom so that the next tile or brick which is to be made may be placed thereon. This manipulation should be made very quickly, so that the supports or trays do not remain too long out of the furnace and are not damaged. So I have been led to contrive a device enabling the workman to quickly place on the incandescent support or tray the mold of sand and the pulverized glass. To this end I use an auxiliary sheet-iron mold of suitable form, designed to receive and to convey the sand that constitutes the main mold and at the same time the material which is to be subjected in its mold to the action of the furnace. I arrange suitably the sand and the pulverized glass in this auxiliary sheet-iron mold, and then it suffices to transport the whole on the incandescent support or tray and to remove the sheet-iron mold. This latter is never exposed to the heat of the furnace, since it only rests upon the hot support or tray for a very short time.

Obviously the above-described process can be employed in the manufacture of other like articles besides that of ceramic stone.

What I claim is—

1. A step in the method for manufacturing artificial stone for obtaining products of uniform appearance, which consists in placing crushed glass of different grades in uniform layers within a mold in a graduating manner.

2. A method for manufacturing artificial stone for obtaining products of uniform appearance, consisting in placing the material in uniform layers in a graduating manner within a mold of refractory material supported in an auxiliary mold upon a suitable support, and then introducing the said support, mold of refractory material and material within the furnace.

3. A method for manufacturing artificial stone, consisting of placing the sand constituting the mold upon a refractory support, placing the material in uniform layers in a graduating manner within the mold, and then suitably heating the same.

4. In a method for manufacturing artificial stone for obtaining products of uniform appearance, which consists in placing crushed material of different grades in uniform layers in a graduating manner within a mold mounted upon an incandescent support, and then suitably heating the said material.

In testimony whereof I have hereunto set my hand in presence of two subscribing witnesses.

LOUIS ANTOINE GARCHEY.

Witnesses:
EDWARD P. MACLEAN,
ALFRED FREY.